US009959777B2

(12) United States Patent
Breed

(10) Patent No.: US 9,959,777 B2
(45) Date of Patent: May 1, 2018

(54) SECURE TESTING DEVICE, SYSTEM AND METHOD

(71) Applicant: Intelligent Technologies International, Inc., Miami Beach, FL (US)

(72) Inventor: David S Breed, Miami Beach, FL (US)

(73) Assignee: Intelligent Technologies International, Inc., Miami Beach, FL (US)

( * ) Notice: Subject to any disclaimer, the term of this patent is extended or adjusted under 35 U.S.C. 154(b) by 0 days. days.

(21) Appl. No.: 15/329,243

(22) PCT Filed: Aug. 19, 2015

(86) PCT No.: PCT/US2015/045846
§ 371 (c)(1),
(2) Date: Jan. 25, 2017

(87) PCT Pub. No.: WO2016/028864
PCT Pub. Date: Feb. 25, 2016

(65) Prior Publication Data
US 2017/0213471 A1 Jul. 27, 2017

Related U.S. Application Data

(60) Provisional application No. 62/040,806, filed on Aug. 22, 2014.

(51) Int. Cl.
*H04N 7/18* (2006.01)
*G09B 7/07* (2006.01)
(Continued)

(52) U.S. Cl.
CPC ........... *G09B 7/07* (2013.01); *G02B 27/0176* (2013.01); *G06K 9/00604* (2013.01);
(Continued)

(58) Field of Classification Search
CPC ...................................................... H04N 19/00
(Continued)

(56) References Cited

U.S. PATENT DOCUMENTS 4,593,384 A   6/1986   Kleijne
5,565,316 A   10/1996  Kershaw et al.
(Continued)

FOREIGN PATENT DOCUMENTS

EP      1175498 B1      7/2005
WO      2016028864 A1   2/2016

OTHER PUBLICATIONS

Search Report and Written Opinion for International Application No. PCT/US2015/045846 dated Dec. 7, 2015.
(Continued)

*Primary Examiner* — Andy Rao
(74) *Attorney, Agent, or Firm* — Brian Roffe

(57) ABSTRACT

Headpiece (10) including a frame (22) having a support portion supported on a test-taker's head, an imaging device (14) that obtains images of an environment around and in front of the test-taker, a biometric identification system (26) that obtains biometric data about the person, a display (12) viewable by the test-taker, and a sound generator and detector (16, 18). A processor on the frame (22) is coupled to these components and controls content of the display (12) based on input received via the imaging device (14) and the biometric identification system (26). The processor also monitors detection of audio communications by the sound detector (16) relative to sound generated by the sound generator (18) and images obtained by the imaging device (14) and a test is displayed on the display (12) to determine whether a person other than the test-taker is present in an image obtained by the imaging device (14) or orally providing information to the test-taker.

20 Claims, 11 Drawing Sheets

(51) Int. Cl.
    *G06K 9/00* (2006.01)
    *H04N 5/247* (2006.01)
    *G10L 17/00* (2013.01)
    *G02B 27/01* (2006.01)

(52) U.S. Cl.
    CPC ........ *G06K 9/00617* (2013.01); *G10L 17/005* (2013.01); *H04N 5/247* (2013.01); *G02B 2027/014* (2013.01); *G02B 2027/0138* (2013.01); *G02B 2027/0178* (2013.01)

(58) Field of Classification Search
    USPC ............................... 348/61–63, 77, 158, 161
    See application file for complete search history.

(56) References Cited

U.S. PATENT DOCUMENTS

| | | |
|---|---|---|
| 5,629,984 A | 5/1997 | McManis |
| 5,915,473 A | 6/1999 | Hoehn-Saric et al. |
| 5,947,747 A | 9/1999 | Walker et al. |
| 6,023,372 A | 2/2000 | Spitzer et al. |
| 6,320,610 B1 | 11/2001 | Van Sant et al. |
| 6,529,209 B1 | 3/2003 | Dunn et al. |
| 6,532,298 B1 | 3/2003 | Cambier et al. |
| 6,665,428 B1 | 12/2003 | Gozzini |
| 6,853,293 B2 | 2/2005 | Swartz et al. |
| 7,054,162 B2 | 5/2006 | Benson et al. |
| 7,069,586 B1 | 6/2006 | Winneg et al. |
| 7,257,557 B2 | 8/2007 | Hulick |
| 7,278,734 B2 | 10/2007 | Jannard et al. |
| 7,551,098 B1 | 6/2009 | Chock et al. |
| 7,758,911 B2 | 7/2010 | Heffner |
| 7,791,809 B2 | 9/2010 | Filipovich et al. |
| 7,792,552 B2 | 9/2010 | Thomas et al. |
| 8,020,220 B2 | 9/2011 | McElroy et al. |
| 8,020,989 B2 | 9/2011 | Jannard et al. |
| 8,165,347 B2 | 4/2012 | Heinzmann et al. |
| 8,203,502 B1 | 6/2012 | Chi et al. |
| 8,223,024 B1 | 7/2012 | Petron |
| 8,467,133 B2 | 6/2013 | Miller |
| 8,472,120 B2 | 6/2013 | Border et al. |
| 8,477,425 B2 | 7/2013 | Border et al. |
| 8,482,859 B2 | 7/2013 | Border et al. |
| 8,488,246 B2 | 7/2013 | Border et al. |
| 8,696,113 B2 | 4/2014 | Lewis |
| 8,733,927 B1 | 5/2014 | Lewis |
| 8,733,928 B1 | 5/2014 | Lewis |
| 8,750,558 B2 | 6/2014 | Lee et al. |
| 8,814,691 B2 | 8/2014 | Haddick et al. |
| 2002/0186838 A1 | 12/2002 | Brandys |
| 2003/0009683 A1 | 1/2003 | Schwenck et al. |
| 2003/0009684 A1 | 1/2003 | Schwenck et al. |
| 2004/0229199 A1 | 11/2004 | Ashley et al. |
| 2005/0201585 A1 | 9/2005 | Jannard et al. |
| 2007/0052672 A1 | 3/2007 | Ritter et al. |
| 2007/0117083 A1 | 5/2007 | Winneg et al. |
| 2008/0089545 A1 | 4/2008 | Jannard et al. |
| 2008/0285801 A1 | 11/2008 | Heinzmann et al. |
| 2009/0008459 A1 | 1/2009 | Mainguet |
| 2009/0097688 A1 | 4/2009 | Lewis |
| 2009/0231722 A1 | 9/2009 | Filipovich et al. |
| 2010/0182020 A1 | 7/2010 | Thornley et al. |
| 2010/0315720 A1 | 12/2010 | Filipovich et al. |
| 2011/0031982 A1 | 2/2011 | Leon et al. |
| 2011/0103585 A1 | 5/2011 | Tuck et al. |
| 2011/0169932 A1 | 7/2011 | Mula et al. |
| 2011/0197327 A1 | 8/2011 | McElroy et al. |
| 2011/0227603 A1 | 9/2011 | Leon et al. |
| 2011/0279228 A1 | 11/2011 | Kumar |
| 2012/0062241 A1 | 3/2012 | Rossi et al. |
| 2012/0063046 A1 | 3/2012 | Rossi et al. |
| 2012/0068914 A1 | 3/2012 | Jacobsen et al. |
| 2012/0176220 A1 | 7/2012 | Garcia |
| 2013/0081127 A1 | 3/2013 | Chen |
| 2013/0127980 A1 | 5/2013 | Haddick et al. |
| 2013/0168683 A1 | 7/2013 | Perez et al. |
| 2013/0286053 A1 | 10/2013 | Fleck et al. |
| 2014/0085452 A1 | 3/2014 | Nistico et al. |
| 2014/0138447 A1 | 5/2014 | Goldman et al. |
| 2014/0267420 A1 | 9/2014 | Schowengerdt et al. |
| 2016/0035233 A1 | 2/2016 | Breed |

OTHER PUBLICATIONS

Search Report and Written Opinion for PCT/US2015/056710 dated Jan. 15, 2016.

SECURE TESTING DEVICE, SYSTEM AND METHOD

TECHNICAL FIELD

The present disclosure relates generally to the field of a computer-based system and method for taking a test while ensuring that the test-taker is not receiving assistance from another person or otherwise cheating while taking the test and that the device being used for displaying or taking the test has not been breached and is not being breached or otherwise compromised.

BACKGROUND ART

There has been a great deal of discussion in the press over the past several years relating to MOOCs, Massive Open Online Courses. Through the use of the Internet, education can be freely distributed to anyone who has Internet access. It is now generally recognized that mastery of almost any field taught in colleges and universities can be achieved by a motivated student without actually attending lectures at that college or university. Thus, the technology is in place for a student to obtain the knowledge that has previously only been available to a campus-resident, matriculated student at a college, university or other institution at virtually no cost.

In contrast, the cost of a traditional Massachusetts Institute of Technology (MIT) education, for example, resulting in a bachelor's degree can exceed one hundred thousand dollars. The only impediment which exists from preventing a university such as MIT from granting a degree to an online taught student is that the university needs to know with absolute certainty that the student did not cheat when taking the various exams required to demonstrate mastery of the coursework. With a degree from MIT, for example, industry will hire such a person at a starting salary approaching or exceeding $100,000 per year. Thus, the value to the student is enormous. Since the information which must be mastered is now available for free on the Internet, the main impediment separating a motivated student from a high starting salary is that a degree-granting university must be certain that the student has demonstrated his mastery of the material through successful completion of examinations without the assistance of a helper or consultant while taking the examinations.

Even when tests are administered in a classroom, it is well known that extensive cheating can occur. In China, for example, where admission to college is solely determined by the score that a student receives on a one time test, the motivation to cheat is enormous.

U.S. Pat. No. 5,565,316 (Kershaw et al.) describes a system and method for computer-based testing. The system comprises a test development system for producing a computerized test, a test delivery system for delivering the computerized test to an examinee, and a workstation on which the computerized test is delivered to the examinee. The method comprises producing a computerized test, delivering the computerized test to an examinee and recording examinee responses to questions presented to the examinee during the delivery of the computerized test. A method of delivering a computerized test is also provided in which a standardized test is created, an electronic form of the test is then prepared, the items of the test are presented to an examinee on a workstation display and the examinee's responses are accepted and recorded. A method of administering a computerized test is further provided in which a computerized test is installed on a workstation and then the delivery of the test to an examinee is initiated.

U.S. Pat. No. 5,915,973 (Hoehn-Saric et al.) describes a system for controlling administration of remotely proctored, secure examinations at a remote test station, and a method for administering examinations. The system includes a central station, a registration station and a remote testing station. The central station includes (a) storage device for storing data, including test question data and verified biometric data, and (b) a data processor, operably connected to the storage device, for comparing test-taker biometric data with stored, verified biometric data. The remote test station includes (a) a data processor, (b) a data storage device, operably connected to the data processor, for storing input data, (c) a biometric measurement device for inputting test-taker biometric data to the processor, (d) a display for displaying test question data, (e) an input for inputting test response data to the processor, (f) a recorder for recording proctoring data of a testing event, and (g) a communication link for communicating with the central station, for receiving test question data from the central station, and for communicating test-taker biometric data, test response data, and proctoring data to the central station. Verification of the test-taker and validation of the results can be performed either before or after the testing event.

U.S. Pat. No. 5,947,747 (Walker et al.) describes methods and apparatus for computer-based evaluation of a test-taker's performance with respect to selected comparative norms. The system includes a home testing computer for transmitting the test-taker's test results to a central computer which derives a performance assessment of the test-taker. The performance assessment can be standardized or customized, as well as relative or absolute. Further, the transmitted test results are configured to reliably associate the student with his test results, using encoding, user identification, or corroborative techniques to deter fraud. Thus, for example, the system allows a parentally-controlled reward system such that children who reach specified objectives can claim an award that parents are confident was fairly and honestly earned without the parent being required to proctor the testing. Fraud, and the need for proctoring, is also deterred during multiple students testing via an option for simultaneous testing of geographically dispersed test-takers.

U.S. Pat. No. 7,069,586 (Winneg et al.) describes a method of and system for securely executing an application on a computer system such that a user of the computer system cannot access or view unauthorized content available on the computer system or accessible using the computer system. To securely execute the application, such method and system may terminate any unauthorized processes executing (i.e., running) on the computer system application prior to execution of the application, and may configure the application such that unauthorized content cannot be accessed, including configuring the application such that unauthorized processes cannot be initiated (i.e., launched) by the application. Further, such system and method may terminate any unauthorized processes detected during execution of the application, and may disable any functions of the computer system that are capable of accessing unauthorized content, including disabling any functions capable of initiating processes on the computer system. The application being securely executed may be any of a variety of types of applications, for example, an application for receiving answers to questions of an examination (i.e., an exam-taking application). Securely executing an application may be used for any of a variety of purposes, including, among other purposes, to assist preventing students from cheating on exams, to assist preventing students from not paying attention in class, to assist preventing employees from wasting time at work, and to assist preventing children from viewing content that their parents deem inappropriate.

U.S. Pat. No. 7,257,557 (Hulick) describes a method, program and system for administering tests in a distributed data processing network in which predetermined test content and multimedia support material are combined into a single encrypted test file. The multimedia support may include visual and audio files for presenting test questions. The encrypted test file is exported to at least one remote test location. The test locations import and decrypt the encrypted test file and load the test content and multimedia support material into a local database. The test is administered on a plurality of client workstations at the testing location, wherein the test may include audio questions and verbal responses by participants. During the course of testing, biometric data about test participants is recorded and associated with the test files and participant identification. After the test is completed, the completed test results, including verbal responses and biometric data, are combined into a single encrypted results file that is exported to a remote evaluation location. The evaluation location imports and decrypts the encrypted results file and loads the test results into a local database for grading.

U.S. Pat. Appln. Publ. No. 2007/0117083 (Winneg et al.) describes systems, methods and apparatuses for remotely monitoring examinations. Examinations are authored and rules are attributed to the exams that determine how the exams are to be administered. Exam proctors monitor exam takers from remote locations by receiving data indicative of the environment in which the exam takers are completing the exams. A remote exam monitoring device captures video, audio and/or authentication data and transmits the data to a remote proctor and data analysis system.

As generally used herein, a "test" is any type of question-based application that requires analysis by a person taking the test and a response from this person. A test may therefore be considered an examination, a quiz, an assessment, an evaluation, a trial and/or an analysis.

SUMMARY OF INVENTION

The present disclosure is directed at solving the problem of guaranteeing with a high degree of certainty that a student taking a test is acting alone without the aid of a consultant or other helper or otherwise cheating.

An arrangement for test taking for use with a computer includes a head wearable device which includes at least one sound sensor for detecting sound, at least one optical imaging device that obtains images of an area viewed by the student, and a display which is only viewable by the test-taker. The display can be a light emitting display such as an OLED, a light reflective display or a retinal projector display. A processing unit is coupled to the sensor(s) and imaging device(s) and receives and analyzes data therefrom to determine whether the test-taker is interacting with another person and/or whether the test-taker is receiving communications from another person. The processing unit also decrypts the tests questions sent to it for display on the display.

A headpiece in accordance with the invention includes a frame having a support portion adapted to be supported on a person's head and a viewable portion adapted to present visual data to the person when the support portion is supported on the person's head. This headpiece may be of the type similar to, for example, Google Glass™. A self-contained electronics assembly includes at least one imaging device and a display and is arranged on a frame similar to a glasses frame and obtains images of an environment around the person when worn on the person's head. A processor is arranged within the self-contained electronics assembly mounted on the frame and is coupled to a computing device such as a personal computer, laptop or tablet. The processor is configured to control content of the viewable portion based on input received from the connected computing device. At least one microphone is integral with the electronics assembly which detects audio communications. The processor monitors detection of audio communications detected by the at least one microphone and images obtained by the at least one imaging device when the viewable portion is displaying a test to determine whether a person other than the person on which the frame is supported is present or providing information to the test-taker. The microphone may be used as a user interface in which case the processor monitors detection of sound by the microphone when the viewable portion is displaying a test.

A method for detecting an attempt to physically alter the electronics assembly in accordance with the invention is a type of chassis intrusion detector. In the method, the device is enclosed within two closely spaced conductive films overlying one another to define an envelope. The capacitance between the films is periodically measured by means of a security assembly coupled to the films, and the measured capacitance is monitored by means of the security assembly to determine changes in capacitance, changes in capacitance being correlated with an attempt to alter the device, i.e., detection of possible intrusion into the chassis of the device. Alternatively, the closely spaced conductive films can be replaced by a film onto which is deposited a labyrinth of conductive wires comprising a continuous circuit. The resistance capacitance and or inductance of the circuit is monitored for a break in the circuit which would correlate with any attempt to breach the electronics and sensor assembly.

The security assembly includes a processor, a power source for providing power to the processor and a volatile RAM assembly containing a required security code, or private key, for use of the device for test-taking purposes. The security assembly is configured such that any attempt to disassemble the security assembly will break one or more wires connecting the power source to the RAM or cause a change in capacitance resistance or inductance relative to a threshold which will cause the security code to be erased from the RAM assembly. The security assembly is coupled to the electronics assembly which with the security assembly resides within the space enclosed by the films or wire labyrinth. An aperture is provided in the envelope defined by the films or wire labyrinth in which the electronics assembly is placed, the aperture permitting a wire to connect the electronics assembly to the external computing device. The films or wire labyrinth are sufficiently transparent as to permit the camera(s) to obtain images there through and permit viewing of the display by the test-taker.

An intrusion-protected electronic device in accordance with the invention includes an envelope defined by two closely spaced conductive films overlying one another, or wire labyrinth, that enclose the electronics assembly including the security assembly coupled to the films and that periodically measures capacitance between the films or the resistance or inductance of the wire labyrinth. The security assembly is configured to monitor the measured capacitance, resistance and/or inductance to determine changes in one of these properties, changes in any of these properties being correlated to an attempt to alter the device.

Additional devices which can be part of the electronics assembly and which are designed to operate through the security films include:

1. A camera for obtaining iris, retinal or partial facial scans.
2. A microphone for monitoring sound in the vicinity of the test-taker.
3. A sound maker used for testing the microphone sensitivity.
4. A camera for monitoring the area between the display and the test-taker's eye.

BRIEF DESCRIPTION OF DRAWINGS

The following drawings are illustrative of embodiments of the system developed or adapted using the teachings of at least one of the embodiments disclosed herein and are not meant to limit the scope of the disclosure as encompassed by the claims.

BEST MODE FOR CARRYING OUT INVENTION

Figure 1A:
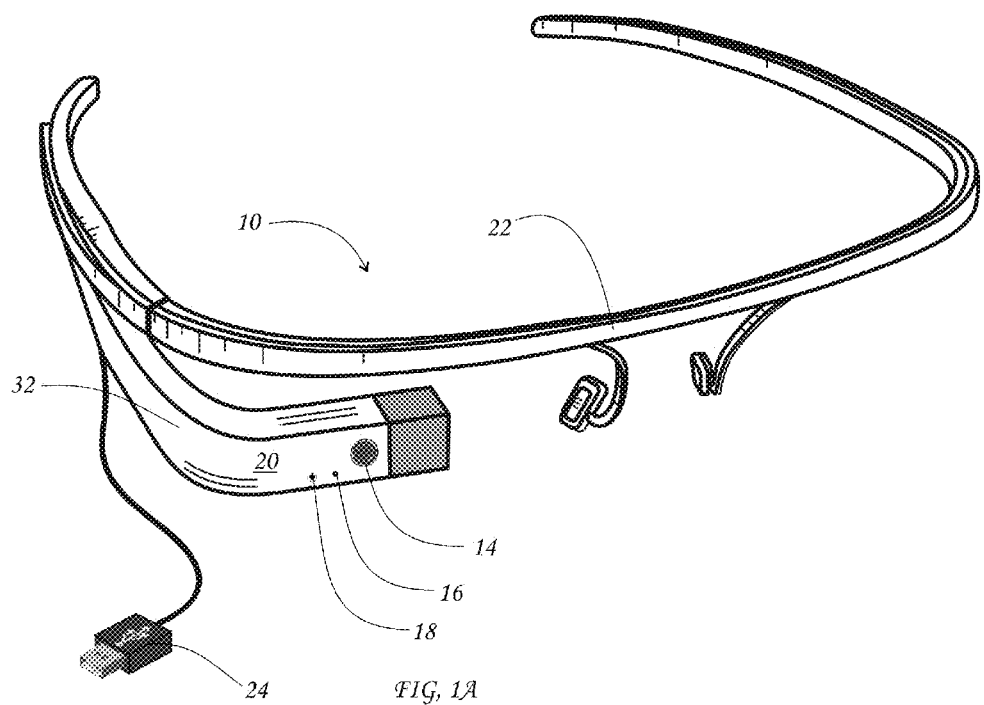
FIG. 1A is a perspective view of a head worn glasses type device containing an electronics assembly with several sensors, cameras and a display all protected with a chassis intrusion detector prepared using the teachings of this disclosure.

A primary concept of the present disclosure is that a student located anywhere in the world ought to be able to obtain the equivalent of a degree from any college or university, providing that the student can prove that he or she has mastered the coursework. This proof naturally must come from the student passing a series of examinations. Since the student can be located anywhere in the world, it can be impractical for that student to travel to a particular place in order to take an examination.

A secondary concept of the present disclosure is to permit a classroom full of students to take a test without cheating.

Hiring organizations basically do not care where the person has acquired the expertise as long as they can be confident that the student has done so. As an employer, for example, a manager does not care as much whether a person graduated from Harvard or MIT but he does care in particular whether the prospective employee has mastered the coursework. On the other hand, having a degree listed on a person's resume can greatly affect the person's opportunities for employment throughout his or her lifetime. In the United States, however, colleges and universities have become unreasonably expensive especially when consideration is given to the fact that for the most prestigious schools, the student usually is required to reside on or near the campus. This residency requirement has little to do with his or her mastery of physics, engineering or other scientific or non-scientific subjects, but handicaps an otherwise qualified student from job opportunities.

A student can typically learn the coursework on his or her own and in fact, studies have shown that for many students attending class is largely a waste of time. Over the Internet, a student can be exposed to the very best teachers providing well constituted lectures, textbooks and other coursework. If this is done with a large number of students, the cost per student is minimal. What is needed, however, is a method of verifying that a particular student has mastered the subject matter through taking and passing a particular examination over the Internet or in a classroom and without cheating and at minimal cost to the institution.

An objective of the present disclosure is therefore to provide a system that is capable of ascertaining the identity of a test-taker with certainty and that cheating has not occurred during test taking. Prior to discussing how these goals are achieved an understanding of the cheating prevention process needs to begin with an analysis of the flow of information from the test providing institution to the student's eyes.

For now, assume that the test is a multiple choice test or one where the answer is in the form of a number. The institution can randomize the questions on a particular test so that no student will take the same test with the same order of the questions. Therefore, knowing the answers provided by one student cannot help another student. As a result, the answers which are sent back to the institution do not need to be encrypted.

The questions making up the test however do need to be encrypted and careful attention needs to be paid to where the decryption process occurs and to the protection of the private key which performs the decryption. For example, if the decryption occurs in an unprotected computer, then two problems arise. First, the decrypted test can be captured and a copy sent to a computer in another room, for example, or the private key can be copied and a second computer anywhere in the world can simultaneously decrypt the test. Once the test can be viewed by a consultant who is not in the test-taker's room, then the consultant can transmit the answers to the test-taker facilitating cheating.

Consider how the consultant might conduct this transmission to the test-taker. Perhaps, the consultant is in an adjoining room and transmits the answers using RF communication to a device hidden on the body of the test-taker which retransmits to a receiver pressed against a bone in the test-taker's head, hidden by his or her hair, or mounted on his or her teeth. Both such devices are readily available. The RF frequencies used can be chosen to be undetectable by any device designed to detect such transmissions since the range of frequencies available span more than 6 orders of magnitude and, in addition, frequency hopping techniques can be used. Also, an RF sensor mounted anywhere on the student cannot pickup such transmissions without knowing the transmitted frequency and coding scheme.

Even if the consultant is in another country as long as he or she can see the test, there is no way to prevent the transmission of the answers to the test-taker. Other methods include vibrators in the seat, wires which attach to the bone-mounted speakers, etc. The consultant can even project the answers onto a portion of the room which is not covered by room monitoring cameras but observable by the test-taker and can even alternate such locations to fool systems that monitor the test-taker's behavior. Basically, there is no method of preventing the consultant from communicating the answers to the test-taker and therefore it is necessary to prevent the consultant from obtaining a copy of the test questions.

If the questions are decrypted on an ordinary computer, then many potential information leakage problems exist. Regardless of the operating system, if the consultant can obtain access to the processor board of the computer, then the connector that connects to the display can be removed and reconnected into a splitter inserted in such a manner that the display operation is unaffected but a second set of wires are now available which contain the display information. These wires can be connected to a small processor which connects them to a transmitter to send the display information to another room by undetectable RF. Alternately, a simple wire can be used, hidden from view of whatever cameras are present.

Another approach is to steal the private key which cannot be protected in an arbitrary computer. Once the consultant has the key, then he or she can intercept the transmissions to the computer and decode the test in a second computer. The conclusion is that the private key must be stored and the decryption process must be undertaken in a special protected device which will be discussed below.

Consider now the display. If there is a display where the questions can be seen from anywhere other than the eyes of the test-taker, then there is another path for leakage of the test questions. Assuming that the decryption occurs right at the display and the display is protected from tampering, the display itself can facilitate transmission of the test questions. A camera looking through an undetectable port in a wall or undetectably worn by the test-taker can capture the image of the test questions and transmit this to a consultant by any number of methods. Thus, either the display must be scrambled so that only the test-taker wearing special glasses can see the questions or the display must be so close to the test-taker's eyes that no one else can get close enough to see it. The second of these approaches will be discussed below. The conclusion is that no ordinary display or ordinary computer is usable without incurring a risk of cheating.

Some methods for accomplishing the objective of cheating prevention which have been considered include using one or more cameras which can image a substantial portion of the space around the test-taker so that a consultant (or other person aiding the test taker) cannot be located in a position where he or she can influence the test taker without being seen by one or more cameras. A structure has been proposed such that the computer on which the test is being taken will not be accessible by another computer in another room, for example, where a consultant can simultaneously view the exam and communicate the answers to the test taker. If this structure is separated from the display and if the display is not scrambled or very close to the test-taker's eyes, as described above, this approach can be easily defeated. Also, it is not required that the consultant be where he or she can be observed by any cameras.

Similarly, it has been proposed that a microphone is preferably available to monitor the audio environment where the test taking is occurring to prevent audio communication with the test-taker by a consultant. A microphone will not pick up communications from the consultant in the form of RF communications translated into sound at a head bone. The microphone will pick up any oral communications from the test-taker and thus is a necessary part of the system to detect if the test-taker is orally reading the questions to a consultant. In order to make sure that the microphone has been activated, a speaker or other sound source may be necessary to periodically create a sound which can be sensed by the microphone. Otherwise, the test-taker can cover the microphone or otherwise render it useless. These and other methods and apparatus are discussed below but already it has become evident to the inventor that the apparatus that is used to take the test must be especially designed to solve the issues mentioned above.

The identity of the test-taker must be known and can be ascertained using one or more of a variety of biometric sensors and systems such as a palm, fingerprint, iris, retinal or other scan, a voiceprint, or a good image of the test-taker coupled with facial recognition as further discussed below. For the purposes of the present invention, the primary biometric identification system will rely on the use of a small camera which has been designed to periodically scan the test-taker's iris, retina or portion of the test-taker's face as discussed below.

When taking a test, the student can go through a process which sets up the apparatus and validates its operation. The student can then confirm his identity which will have been previously established and stored locally or remotely for comparison. The process of ascertaining the identity can be recorded for later validation. Output from the various monitoring systems can be fed to one or more pattern recognition systems such as trained neural networks which have demonstrated a high accuracy.

Each time the student takes a test and demonstrates his or her proficiency in knowing the course work, he or she can be awarded credits and after sufficient credits have been obtained, he or she can be awarded a degree. After the degree award, the student would then presumably begin working for a company, government agency, or other organization and the system should periodically be verified through consultations or surveys with the management of the organization to ascertain that the hiring organization is satisfied with the proficiency of the student as learned from the online courses. This feedback allows for continuous improvement of the overall process and system.

Naturally, the degree granting institution will incur some costs during this process and thus, some payment from the student to the institution may be considered. Depending on the circumstances, this payment can be a charge per course, per test or per degree. Since the earning power of the student can be significantly increased, and the out-of-pocket cost to the institution is small, these payments can be postponed until the student is being paid by a hiring organization and, in fact, such an organization may be willing to cover these payments. In any event, the payment should be very small when compared to the typical cost of a traditional college education. However, the degree-granting institution by this method, can greatly expand the number of degrees granted and thus although the payment per student will be small, the total sum earned by the institution can be large.

A good review of the state of higher education in the United States and in particular of the rise of MOOCs can be found in the Nicholas Carr's article on the subject as published in the MIT technology review. The article can be found on the following Internet website. http://www.technologyreview.com/featuredstory/429376/the-crisis-in-higher-education/. Quoting from this article "Machine learning may, for instance, pave the way for an automated system to detect cheating in online classes, a challenge that is becoming more pressing as universities consider granting certificates or even credits to students who complete MOOCs." It is the objective of this disclosure to respond to the mentioned challenge.

As discussed in numerous places in the literature, there is a significant difference in the complexity of evaluating a student's proficiency through tests which can be machine graded depending on the course subject matter. For those math and science courses where a numerical answer is to be derived, machine evaluation of the test is relatively simple. However, for those disciplines where a reasoning or writing skill or in particular an artistic skill is evaluated, there is great controversy as to whether this can be done by machine testing. This issue will not be addressed further here other than to note that more research in this area is necessary.

It is not an objective of this disclosure to determine how a test should measure a student's proficiency nor how it should be graded. The primary objective here is to provide confidence to the degree-granting institution that the student who is taking a test is in fact the student who has registered for the course and that the student is acting alone without the aid of a consultant who may be remote or nearby. This assurance should be provided with a probability of cheating reduced to on the order of one in 100,000 and, similarly, the false accusation that cheating is taking place reduced to a similar probability.

When a student decides to enroll in a degree program, for example, or even to enroll in a particular course for which he or she desires credit, the first step will generally be to register with the organization, typically a college or university, and to establish the beginning of the student's record. During this registration process, for the case where the student intends to get credit for one or more courses taken online, the student will be required to submit various types of information which will permit the student to be identified positively over the Internet. Although generally there may be no charge for taking the course, there will generally be some charges related to the test taking and administration of the student's program. In a preferred embodiment of this invention, a specially configured device will be sold to the student to be used primarily for test taking.

Wearable glasses which meets the objects of this invention is described below and is configured so that all of the functions necessary to identify the student and significantly reduce the opportunity for cheating are incorporated within the glasses design, hereinafter called the Test Glasses. At the end of the course or when the student completes his relationship with the institution, he or she may be required to return the glasses; however' since the glasses will be linked to the student's biometric=based identification, the biometrics stored on the device would need to be erased or overwritten by those of another student as described below.

Since the value of a degree from a prestigious institution can be immense, the motivation to cheat when taking a test can be enormous. One can foresee, for example, an industry of consultants developing solely for the purpose of aiding students in taking tests and thus obtaining a degree. The system of this disclosure is therefore configured to minimize the possibility of success of such consultants.

If a student, when taking a test, is inclined to cheat, this inclination can be facilitated if a helper or consultant has access to the display which shows the test while it is being taken. If the consultant has such access, then he or she will use a communication method by which he or she can transfer information to the test-taking student in a manner that cannot be detected. This disclosure is intended to minimize the opportunity of the consultant from observing the display or otherwise learning the content of the test questions and/or of being able to communicate with the test-taker.

If the student were to use his or her private computer for displaying a test, it would be generally relatively easy for a consultant to attach a second remote monitor which would display the same information as the primary monitor. There exists software, for example, which permits someone who is even located remotely from a particular computer to observe the display of that computer. Alternatively, if the student or his consultant has access to the ports and operating system of the computer upon which the student takes tests, access to the information on the display is relatively simple to achieve. The only method of preventing this is to design a device which prevents other computers from connecting with the device in such a manner that the display can be copied. Thus, in a preferred implementation of the invention, it will be assumed that a special device, and in particular a wearable glasses type device, has been configured and provided to the student for those cases where the student desires credit for the course he or she is taking.

A device constructed in accordance with the teachings of this invention is illustrated in FIG. 1A which is a perspective view of a head worn glasses type device, the Test Glasses, containing an electronics assembly with several sensors, cameras and a display all protected with a chassis intrusion detector prepared using the teachings herein. A head worn display and electronics device constructed in accordance with the invention is shown generally at 10 in FIGS. 1A and 1B.

A housing 20 extends from a frame 22. Housing 20 is substantially L-shaped with a first portion extending straight outward from an edge of the frame 22 and second portion perpendicular to the first portion and positioned in front of the frame 22.

A display 12 is arranged on or in the housing 20 and pointed toward the right eye of test-taker displays the test questions (although alternatively, a display can be pointed toward the left eye of the test-taker). A forward viewing camera 14, representative of an imaging device, is also arranged on or in the housing 20 and monitors the field of view of the student outward from the device 10. The camera 14 can have a field of view of approximately 120°. A microphone 16 is also arranged on or in housing 20 and monitors talking (sounds) which can take place while the test is in progress. A sound maker or speaker 18 is arranged on or in the housing 20 and periodically provides a sound detectable by the microphone 16 so as to verify that the microphone 16 has not somehow been rendered inoperable.

The display 12 is arranged at a terminal end of the second housing portion. The forward viewing camera 14, or more generally an imaging device, the microphone 16 and the speaker 18 are also arranged on the second housing portion (see FIG. 1A).

Each of these components 12, 14, 16, 18 is connected to a processor-containing electronics package in housing 20 which is mounted to the glasses frame 22 in a manner known to those skilled in the art to which this invention pertains. A cable emanates from the electronics package in housing 20 and can contain a USB connector 24 for connecting onto an external device such as a computer.

Figure 1B:
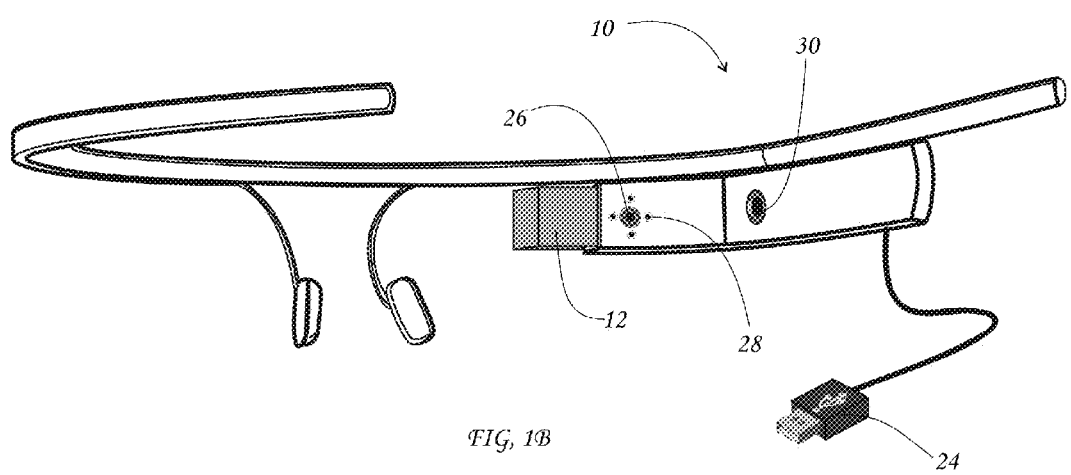
FIG. 1B is a perspective view of the apparatus of FIG. 1A seen from the rear.

An iris or retinal scan camera 26 is arranged on housing 20, pointing inward toward the wearer, and measures biometrics of the test-taker (see FIG. 1B). Such biometrics can include an iris or retinal scan or a scan of the portion of the face surrounding the eye. Illumination of the eye can be provided by LEDs 28 arranged on the housing 20 which can be in the IR or visible portions of the electromagnetic spectrum. Two or more different levels of visible illumination can be provided to cause the iris to be seen at different openings to check for an artificial iris painted onto a contact lens. The iris scan camera 26 and LEDs 28 are arranged on the second housing portion (see FIG. 1A).

A camera 30 can also be provided on or in housing 20 to check for any anomalous activity which might take place in the vicinity of the glasses 10 (see FIG. 1B). Such a camera 30 can enable detection of whether an image capture device has been either temporarily or permanently affixed to the device 10 or to the face of the test-taker which is capable of capturing the image on the display 12. Similarly, camera 30 can monitor the space surrounding the left eye of the test-taker to assure that such an image capturing device and or another display for providing aid to the test-taker is not being employed by the student in conjunction with his left eye. The camera 30, or more generally an imaging device, is arranged on the first housing portion and oriented to image most of the frame 12 (see FIG. 1B).

Software and a processor which controls administration of tests is resident on the external computer, in the electronics package in housing 20, or in another device, not shown, which attaches to the device 10 through connector 24. A student will have access to a keyboard and/or a mouse for interacting with this computer, not shown. Using a keyboard, the student can initiate the test taking process through communication with the test provider. When the test is ready for execution by the student, and encrypted version of the test is transmitted to the computer and relayed to the device 10. The electronics package in housing 20, e.g., including a processor, utilizes a private decryption key to decrypt the test questions and cause them to be displayed on display 12. The test-taker then enters the answers to the questions using the keyboard and the computer display.

The test is preferably configured such that the answers do not provide information relative to the question. Therefore, someone viewing the answers cannot discern therefrom the questions. Therefore, the question answers do not need to be encrypted but can be sent in an on unencrypted form to the test providing institution.

For example, if the test providing institution is providing tests to 1000 students either simultaneously or at different times, and if the test is of a multiple-choice type and contains 50 questions, the order of the questions will be different for each test provided. Since this provides a very large number of different tests each containing the same questions, there is little risk that answers from one set of questions can be of any value to a student taking a different ordered set of the same questions.

The entire electronics package of the device 10 is encapsulated in a thin film 32 called a chassis intrusion detection film. This film can comprise two conductive layers separated by thin layers of plastic. The electronics package in housing 20 can contain a processor or structure providing processing capability for measuring the capacitance between the two conductive layers. If this capacitance is changed, as might happen if someone attempts to break into the electronics package, then the event can be detected through a change in this property. Alternatively, an array of wires can be printed onto a plastic film either before or after it has encapsulated the electronics package in housing 20 in such a manner that any attempt to break into the housing 20 will sever or otherwise disrupt one or more of the wires. The wires can be made from indium tin oxide and thus be transparent. The wires can be thin, such as about 0.005 inches wide, and have a similar spacing.

The private key for decoding the test questions and any other commands sent by the test providing institution can be held in volatile RAM memory in, for example, housing 20 which is kept alive through an extended life (10 years) battery which also can be recharged when the device 10 is connected to the host computer through connector 24. If the chassis intrusion detector system detects an attempt to break in to the housing 20, then the power to the RAM memory will be shut off and the private key permanently lost.

When the test-taker is preparing to take a test, he or she will place the device 10 onto his or her head. When this happens for the first time, attributes of the retinal, iris or other biometric scan will be recorded in memory for later comparison. When this is accomplished, a signal can be sent to the computer or processor indicating that the test-taker is ready to take the examination. When the test-taker engages in taking a second test at a later time, a new biometric scan will be conducted to ascertain that this is the same person who originally registered using this device 10. If this scan comparison, e.g., performed using the processor in electronics package in housing 20, is successful, then the display will be activated and a signal can be sent by the processor to the test provider via the external computer to forward the encrypted test.

The biometric scan camera 26 is controlled to periodically check to ascertain that the test-taker's iris is present and that it has not changed, possibly in conjunction with the processor in the electronics package in the housing 20. If anything anomalous occurs, such as the absence of an iris or the change of an iris, then the display 12 will be deactivated by the processor. Thus, when the student removes the device 10, the display 12 will automatically stop displaying the test questions. Similarly, if the student transfers the device 10 to another person whose iris does not match that of the student, then the display 12 will not show the test questions. Above and in what follows, the iris will be used to represent any of the aforementioned biometric scans.

When the student has completed the test questions, then he or she will indicate such through the computer keyboard and the display 12 will no longer display test questions. The remainder of the interaction with the test providing facility will then occur through the keyboard and/or mouse and the external computer.

The forward-looking camera 14 can have a field of view of 120°. This field of view will cover the hands of the test taker to check for the case where the test-taker is typing in the questions on a keyboard where they are transmitted to a consultant. If the hands of the test-taker cannot be seen by camera 14, the display will be turned off until the hands can be seen. If this happens frequently, then the test can be terminated. Camera 14 can also be used to check for the existence of other devices in the vicinity of the test-taker. These devices may include a tablet computer, a smart phone, books or papers, displays other than the test answers on the external computer display, or any other information source which is not permitted for the particular test. Naturally, if the test is an open book tests, then searching of the above listed objects can be permitted. The software which accomplishes these pattern recognition tasks can utilize one or more trained neural networks.

A limited number of encrypted commands which relate to the particular test being administered can be transmitted with the encrypted test from the test providing institution. These commands control some aspects of the test taking process such as whether it is an open book or closed book examination, whether it is a timed test, how many restarts are permitted, how many pauses are permitted etc., since the test process is controlled by the Test Glasses, these commands will be decrypted and used to guide the test taking process by the Test Glasses.

Camera 30 similarly can be used to check for anomalies in the vicinity of device 10. Again, the pattern recognition software used with camera 30 can utilize one or more trained neural networks. This camera 30 can check for small cameras which may have been glued to the face of the test-taker which are not observable by the iris scan camera 26 but nevertheless can capture a view of the image displayed on display 12. This of course is less of a problem if a direct retinal projector display is utilized. This camera 30 also can be used to monitor for anomalous devices which can be seen by the student's left eye which could be a source of information to the test taking student. To further guard against such anomalous events, a second camera, not shown, may be placed on frame 22 but at another location giving a better view of the space surrounding the student's left eye.

Generally, there should be no talking while test taking is in progress. Microphone 16 is used to detect audio sounds and in particular spoken words. If such words are detected particularly emanating from students, then the test can be paused or terminated depending on the test-providing institution's requirements. Information as to what the response required of device 10 for this or any other anomaly can be sent in encrypted form from the test providing institution. In order to prevent spoofing of these commands, when the device 10 detects an anomaly, it can transmit a request for action to the test-providing institution via the host computer. The test-providing institution can respond with encrypted instructions as to what action to take.

The encrypted instruction can include a rolling code such that messages requiring the same result from the apparatus 10 will not identical and thus not able of being spoofed. In order to prevent microphone from being covered with sound absorbing material, a speaker or sound creator 18 is provided to periodically create a sound which is then detected by the microphone and the quality of the detected signal can be ascertained. If the microphone cannot clearly hear the sound produced by the speaker, then the tests can be terminated until the issue is resolved. Speaker 18 may be placed at an alternate location on the housing 20 or frame 12 of in order to minimize direct sonic conduction through the structure.

FIG. 1B is a perspective view of the apparatus of FIG. 1A looking from the rear.

Figure 2:
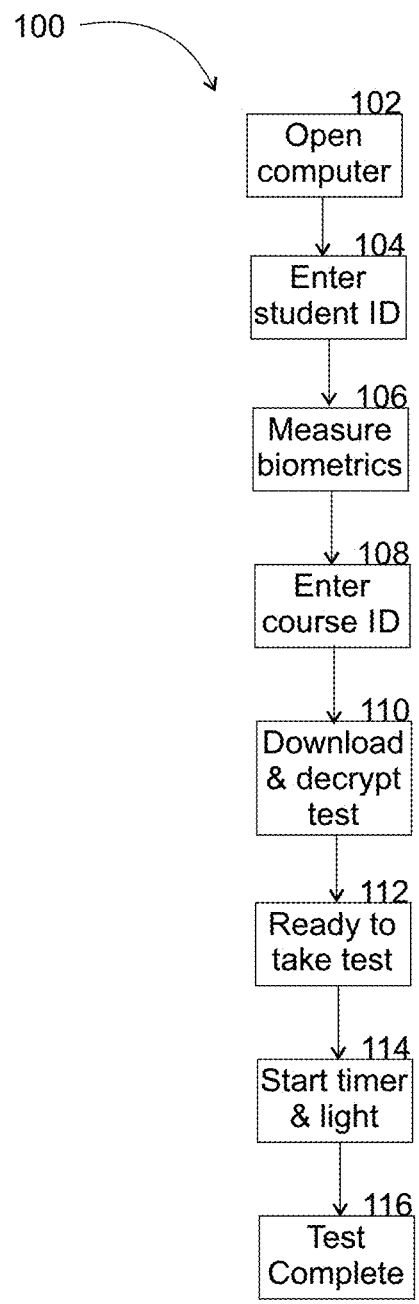
FIG. 2 is a flowchart illustrating a startup, running, and shut down of the test taking process in accordance with the invention using the apparatus shown in FIGS. 1A and 1B.
Figure 10:
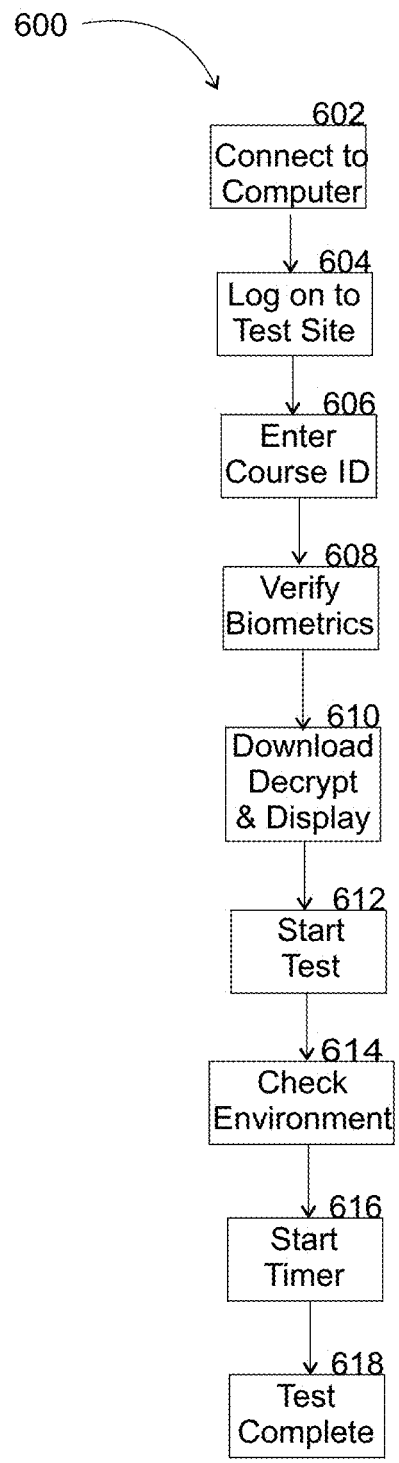
FIG. 10 is a flowchart illustrating a startup, running, and shut down of the test taking process in accordance with the invention.

A flowchart illustrating a startup, running, and shut down of the test taking process is illustrated in FIG. 2 generally at 100 and in more detail in FIG. 10. At step 102, the student activates the host computer to begin the test taking process. At step 104, the student enters his ID which is transmitted to the test-providing institution, most likely via the Internet. The device 10 then uses the iris camera 26 to scan the iris of the test taker at step 106. As mentioned above, other biometrics can be substituted for the iris scan; however, for the purposes of this disclosure, all of these various biometric measurements will be equivalent to an iris scan.

In the event of a successful passing of the iris scan in comparison with the stored attributes of a previous iris scan, the device 10 will indicate to the host computer that the biometrics verification has been successful. The student will then be requested to identify the course ID for which an examination is requested at 108. The test will then be downloaded at 110 in encrypted form to the host computer and relayed to the device 10 where it will be decrypted and display onto display 12. The test will then commence at step 112, the timer started if appropriate at 114 and student will enter his or her answers using the external computer until completed. When the student has completed the tests, he will so indicate using the external computer and the process finishes at step 116.

For the case where a fixed time limit is provided for taking the test, an encrypted message indicating this fact will be sent from the test-providing institution to the host computer and from there to the device 10 and a timer will initiated within the electronics package in housing 20 which will then turn off display 12 at the end of the allotted time.

As discussed above, when a student attends a teaching institution, he or she may indicate his or her desire to take examinations at a private location apart from the institution, in which case, the institution will provide the student with device 10. The institution then can take a pre-manufactured device 10 and create a public-private key paired set of encryption keys and then download the private key onto the device 10. Once the private key is resident on the device 10, a command can be sent to disable future communication with the RAM memory in housing 20. This can be done through burning of fused links within the device 10. At this point, the private key can no longer be changed and the institution will then erase its copy of the private key wherein the only existing copy resides on the Test Glasses where it cannot be retrieved.

When a student matriculates, the institution can enter the student's ID into the device 10 and then ship the apparatus to the student. When the student first utilizes the device 10, the device 10 will capture the pattern of the student's iris and store it in memory in the electronics package in housing 20. Once this has been accomplished, the device 10 can only be used by that particular student and the test providing institution can only communicate with the device 10 through encrypted messages using the public key portion of the encryption keys pair. Later, when the student terminates his or her association with the institution and returns the device 10 to the institution, the institution can send encrypted messages to the device 10 which erases the students ID and iris scan attributes from the device memory and the device 10 is now suitable for reuse by another student.

Figure 3:
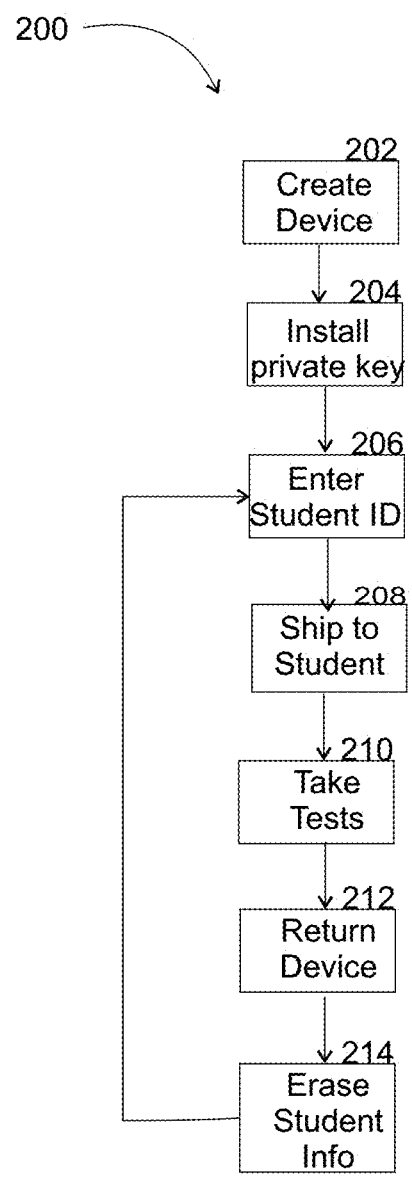
FIG. 3 illustrates a flowchart for the encryption scheme utilized by the apparatus shown in FIGS. 1A and 1B to prevent access to the test by other computers or devices than the designated head worn apparatus.

This process depicted in FIG. 3 generally at 200 where the device is manufactured at step 202 and encoded with the private key at 204, the student's ID is entered at 206 and the device shipped to the student at 208. The student uses the device for taking tests at 210 and when finished, returns the device to the institution at 212. The institution then erases the student's ID and biometrics at 214 and the device 10 is ready for a new student ID at 206. Note that under this implementation, the student's biometrics never leave the protection of device 10 and cannot be used for any purpose other than identifying the student from test to test.

Figure 4:
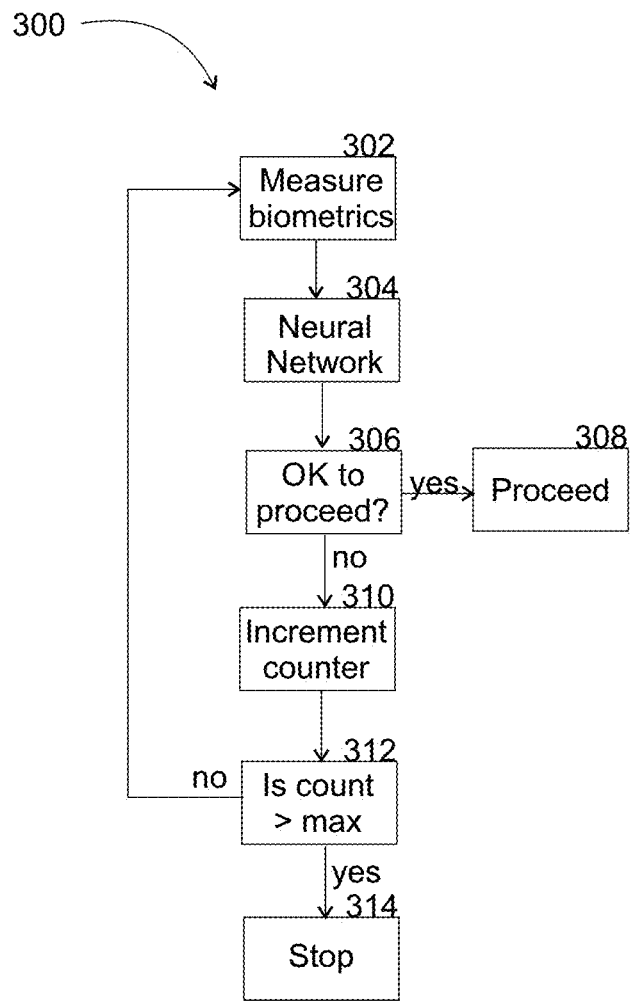
FIG. 4 is a pattern recognition flowchart using neural networks for identifying the test taker using the apparatus shown in FIGS. 1A and 1B.

FIG. 4 provides a flowchart for the iris scan verification process shown generally at 300. At step 302, the iris imaging camera 26 takes an image of the student's iris and transmits the image to step 304 where a comparison of the immediately obtained image to the stored image is conducted. In a preferred implementation, two images on the iris are retrieved under two level of visual illumination and both images are made available for analysis. The illumination levels are controlled by the LEDs 28 which are provided to guard against the student wearing contact lenses containing a printed iris. Other biometric measurements can be made in a similar manner such as a retinal image or an image of blood vessels in the student's face. For the purposes herein, the word iris will be used to represent all such biometric measurements.

If the iris comparison test is passed as indicated in step 306, the test decryption and display process proceeds at step 308. If the test fails, then the student is notified to adjust the device 10 and the counter is incremented at step 310. The count is checked at step 312 and if it is below the maximum established by the test-providing institution, then the test is repeated. If the count is at a maximum, then the test taking process is terminated at step 314.

The iris camera 26 will continue to monitor the student's eye and if at any time the iris is not detected, then the display 12 is turned off until the iris reappears. This might happen if the student removes the device 10 from his or her head to take a break, for example. After such a break and at other random times, the iris check can be repeated to ascertain that the same student is using the device 10. Thus, the continued test taking process is monitored to guard against the change of the test-taker or any attempt to make the display 12 visible by anyone other than the authorized student.

When the iris checking process is complete, the test can be transmitted to device 10, decrypted and displayed.

To use the device 10 in this manner, the electronics, sensors and display should be protected with a chassis intrusion detector with the private key stored in RAM volatile memory with its own long life battery power supply as described herein. If this is not the case, then the device 10 can be opened and the display images transmitted off the device 10, and if the private key is stored in nonvolatile memory, it can be retrieved and used by another computer which is designed to spoof the device 10. With the cost of education approaching or exceeding $100,000, there is ample motivation to undertake these actions. The chassis intrusion detector is described below.

Figure 5A:
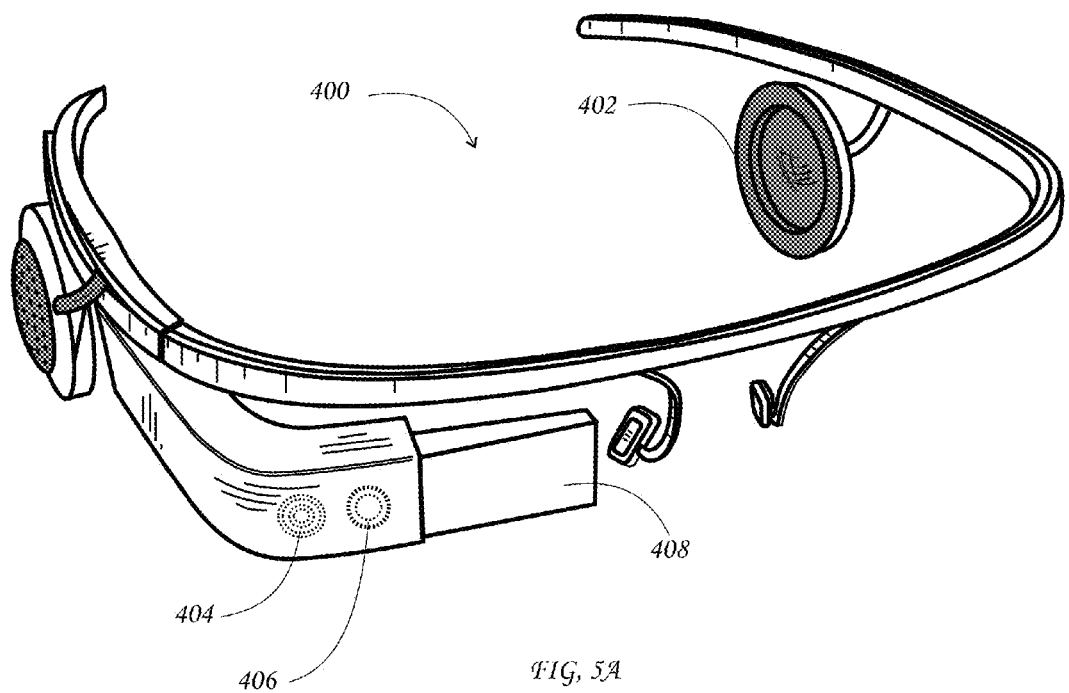
FIG. 5A is a perspective view of a similar apparatus using a modified Google Glass™ as a test taking device.
Figure 5B:
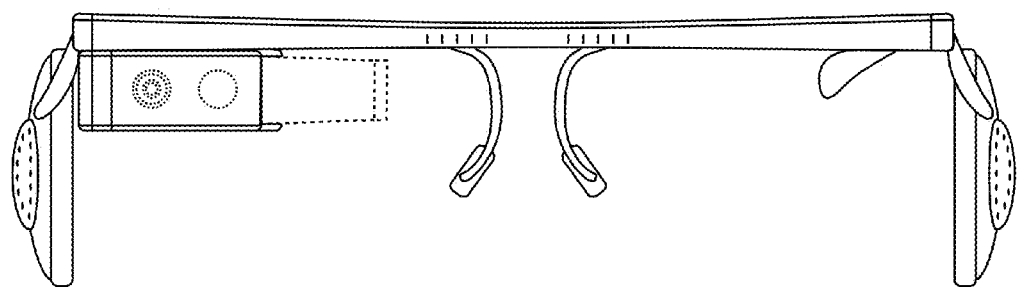
FIG. 5B is a plane view of FIG. 5A looking from the front and FIGS. 5C and 5D are similar views to FIGS. 5A and 5B but showing the addition of prescription lens.
Figure 5C:
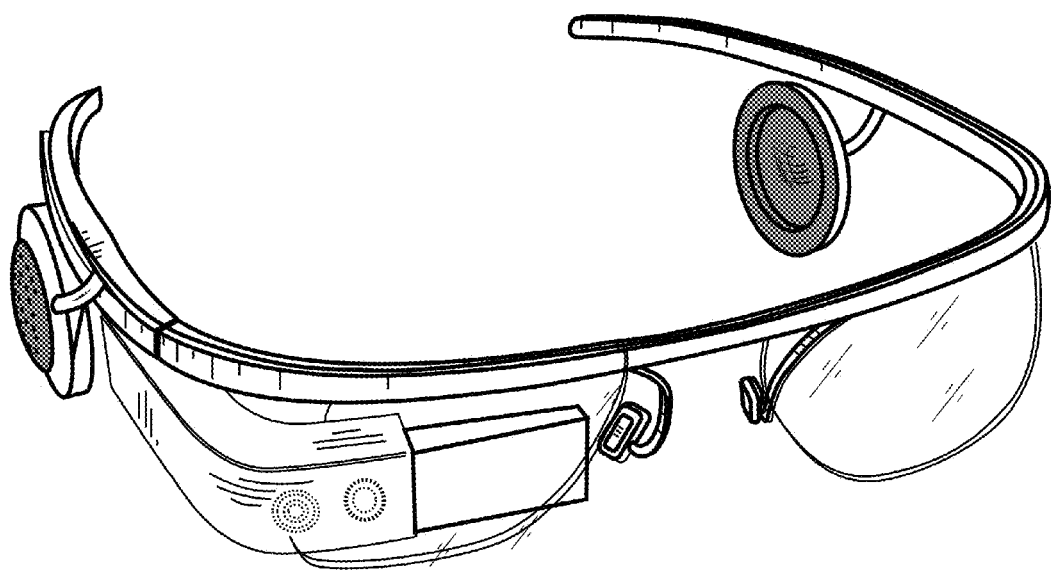
Figure 5D:
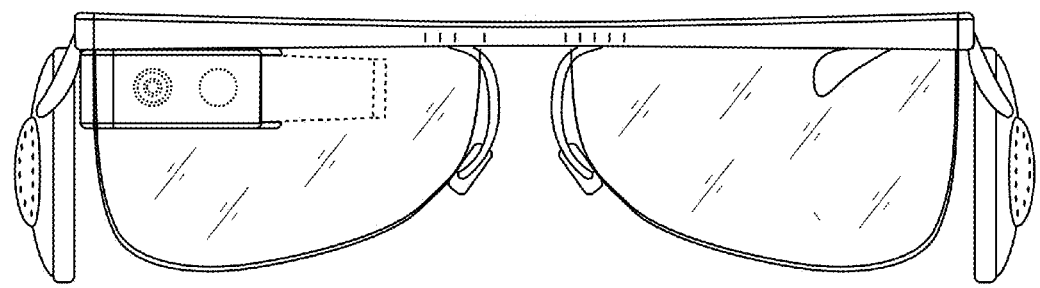

FIG. 5A is a perspective view of a similar apparatus using a modified Google Glass™ as a test taking device, FIG. 5B is a plane view of FIG. 5A looking from the front and FIGS. 5C and 5D are similar views to FIGS. 5A and 5B but showing the addition of glass lenses. An advantage of this design is that secure test taking can be an add-on feature of Google Glass™ thus providing many more uses for the device other than for dedicated test taking. The device is shown generally at 400 and includes added headphones 402, a forward looking camera 406, a microphone 404 and a display 408, all in a housing attached to or integral with the frame of the glasses. Since Google Glass™ does not come equipped with a chassis intrusion detector and since the test decryption would occur in the general processor, the device is prone to being hacked which would defeat the purpose of a secure testing device. Also, the display 408 can probably be observed from the front thus providing an easy access to the test display by a consultant. Nevertheless, Google Glass™ can be modified by adding a chassis intrusion detector and other features as described herein to render it a dual purpose device allowing a student to get the advantages of Google Glass™ as well as a secure test taking device. Of course, the headphones 402 could be replaced with a bone speaker as in Google Glass™.

Figure 6:
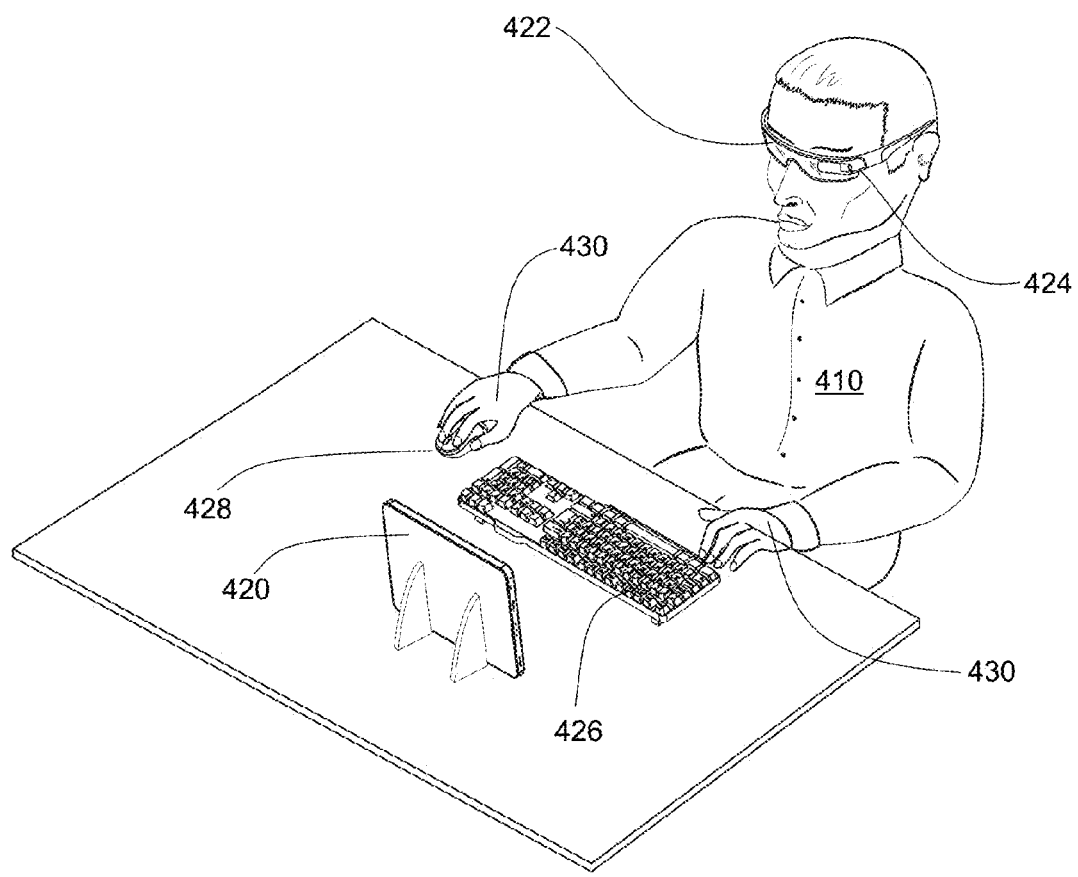
FIG. 6 is a view of a test-taker using the head worn apparatus of FIGS. 1A and 1B with the addition of prescription lenses interacting with a computing device.

FIG. 6 illustrates a view of a test-taker using the head worn apparatus 422, as in FIG. 1 with the addition of prescription lenses, interacting with a computing device represented by a tablet 420. Although the touchscreen on the tablet 420 could be used, in this example a keyboard 426 and mouse 428 are provided to simplify the test taking process. The apparatus 422 provides a forward looking camera 424 which is different from cameras used in Google Glass™, for example, in that it provides a field of view that closely matches that of the student.

In particular, the hands 430 of the student can be monitored by this camera 424 to ascertain that the student is not communicating with the consultant through typed messages using the keyboard 426. Since the computer used by the student to provide answers to the questions has not in any way been secured, it could be used as a method for the student to communicate with a consultant. Similarly, other devices such as a smart phone or additional tablet computer, may be hidden by the student and used to send the questions to the consultant and receive communications back relating to the appropriate answers. Thus, the camera 424 and the associated pattern recognition software is an important aspect of this invention.

The pattern recognition software can be located within the electronics package associated with the device 422, e.g., in a housing extending from or integral with the frame, and can be based on a trained neural network. One key advantage of this approach is that as experience is gained with the system, the neural network can be readily trained to check for various newly discovered cheating methods. The fact that neural networks can be used in this fashion permits continuous improvement of the apparatus 422.

There are other sensors including the iris imaging camera, the eye-to-display monitoring camera, and the microphone, that similarly provide data which contain patterns which are appropriate for neural network analysis. In some cases, initially this analysis can be simplified by using the differences between two images. For example, for the eye-to-display monitoring camera, it is expected that the image of this should be invariant and therefore any significant changes in that image would be indicative of an anomaly which should be brought to the attention of the student for remedial action. Similarly, once the test has begun, there should be no voices sensed by the microphone and therefore if any voice frequencies are present the anomaly can be highlighted for remedial action by the student. The iris image analysis can be somewhat more complicated, however, again since it is the difference between two such images which is significant, the analysis can at least initially be relatively uncomplicated. The difference between two images of the same student should be relatively minor whereas the difference between another person's iris image and that of the student can be quite complicated. This should be easily detectable. In order to guard against the use of a contact lens with a painted surface showing an invariant iris image to a iris imaging camera, LEDs 28 are provided to cause the iris to change its opening aperture due to more intense illumination thereby giving two different images of the iris for verification. Again however, the analysis can be relatively simple where in the first instance the iris which is imaged under the two different conditions is recorded and thereafter only image subtraction and relatively minor analysis is required.

An objective of this test taking system is that it is completely automatic without requiring the intervention of any human other than the test-taker 410. The institution administering the test will have a limited set of rules which, if violated, will render the test invalid. These rules can be general rules or rules specific to the particular test being taken. These rules can include: the events which will invalidate a test; the number of times that the test, once an event has occurred, can be restarted if any; the number of times that a particular test can be taken if failed; the time permitted to take the test; the number and length of pauses permitted during the test taking process; etc. The rules may or may not be notified to the test-taker 410.

All of this puts a small burden on the institution to draw arbitrary lines as to what constitutes cheating and what does not. This is a relatively light burden with the test taking apparatus, the Test Glasses, since once the rules have been set the opportunities for an undetected violation of these rules are very limited or nonexistent.

A substantial number of sensors have been introduced, each of these sensors requires an algorithm to assess the sensor output and determine whether the test-taker is cheating or not. Since the Test Glasses are provided with a chassis intrusion detector (CID), as discussed below, it is virtually impossible for a consultant to modify the apparatus 422 so as to transmit the display information to another room, for example. With a CID, there are no accessible wires which connect the display to the electronics package, for example. Finally, the display itself is protected. The test-taker 410 can wear a camera which has a lens the size of a small pea but in order for that camera to see the display, it will also be seen by the iris imager or the eye-to-display cameras.

Of course, if a cheating method is discovered, it will quickly become public through the Internet, defeating the Test Glasses solution. Therefore, a continuous improvement process which rewards students who discover cheating methods should be implemented.

At the discretion of the institution, a time limit or no time limit can be afforded the test-taker 410 for completing the test. Similarly, a course can have only a single final exam or a series of quizzes in addition to a final exam or feedback can be requested from the test-taker 410 during each course session depending on the course and the desires of the institution. Since all such tests will be graded automatically, the cost of having daily or more frequent quizzes versus a single final exam is insignificant. In one extreme case, all of the required courses can be given without any exams and a final comprehensive exam can be used to validate a student for receiving a degree. Alternately, the student can be tested continuously during the course or degree process without any final examinations. These decisions are left up to the institution. These options are facilitated due to the ability of the student to observe instruction presented on the computer screen and at arbitrary times be tested using the Test Glasses.

The student can enter data into the testing program through the keyboard 426, a track pad (not shown), and/or the mouse 428, or any other type of user interface such as a touch screen of the laptop computer 420. The mouse 428 can be attached to the computer 420 with a fixed wire or be wirelessly connected to the computer 420.

Various biometric technologies for verifying the identity of the test-taker for use with Test Glasses will now be discussed. Since the Test Glasses are mounted on the head in front of the eyes, the most readily available biometrics are images of the eyes or facial tissues surrounding the eyes. A variety of different biometric tests can be devised, but the most common are retinal scans and iris scans. Both of these are available using a camera mounted in conjunction with the display. The retinal scan is used to examine the pattern of blood vessels at the back of the eye. Although retinal patterns may be altered in cases of diabetes, glaucoma or retinal degenerative disorders, the retina typically remains unchanged from birth until death. Due to its unique and unchanging nature, the retina appears to be the most precise and reliable biometric, aside from DNA. Advocates of retinal scanning have concluded that it is so accurate that its error rate is estimated be only one in a million. The blood vessels within the retina absorb light more readily than the surrounding tissue and are easily identified with appropriate lighting. A retinal scan is performed by casting an unperceived beam of low-energy infrared light into a person's eye as they look through the scanner's eyepiece. This beam of light traces a standardized path on the retina. Because retinal blood vessels are more absorbent of this light than the rest of the eye, the amount of reflection varies during the scan. The pattern of variations is converted to computer code and stored in a database.

The iris scan is an automated method of biometric identification that uses mathematical pattern-recognition techniques on video images of the irises of an individual's eyes, whose complex random patterns are unique and can be seen from some distance. Not to be confused with other, less prevalent, ocular-based technologies, retina scanning and eye printing, iris recognition uses camera technology with subtle infrared illumination to acquire images of the detail-rich, intricate structures of the iris externally visible at the front of the eye. Digital templates encoded from these patterns by mathematical and statistical algorithms allow the identification of an individual. Many millions of persons in several countries around the world have been enrolled in iris recognition systems, for convenience purposes such as passport-free automated border-crossings, and some national ID systems based on this technology are being deployed. A key advantage of iris recognition, besides its speed of matching and its extreme resistance to false matches, is the stability of the iris as an internal, protected, yet externally visible organ of the eye.

Both of these scans are extremely accurate and very difficult to fake. Since the apparatus for conducting these scans is protected by the chassis intrusion detector system, they are the preferred biometric identification systems for use with this invention. Although it has been proposed that secure testing systems utilize more than one biometric identification, the accuracy of either of the retinal or iris scans is so high as to eliminate the need for a second biometric. The iris scan is somewhat easier to implement and therefore is the preferred system for use with this invention.

Consideration is necessary concerning where the test-taker's biometrics are stored. If they are transmitted to the test-providing institution, then there is the risk that if they are not encrypted that the transmission can be captured, allowing a consultant to log on as the test-taker in the future. If they are encrypted at the laptop, then even the encrypted biometrics can be captured and used by the consultant. A solution is for the institution to transmit an encrypted random number to the laptop which combines that number with a code representing the success or failure of a biometrics measurement and transmits a combination of the decrypted random number and the code back to the institution. For example, assume that the random number was 45896 and 1 represents a biometrics failure and 0 a success. The laptop upon failure of the biometrics test would return 45897 to the institution and the institution would then not proceed with the test. Thus, if the private key is secure on the laptop, then only the laptop needs to know the test-taker's biometrics which will be stored only locally and can be stored in a coded manner which makes spoofing by another system difficult or impossible.

Figure 7:
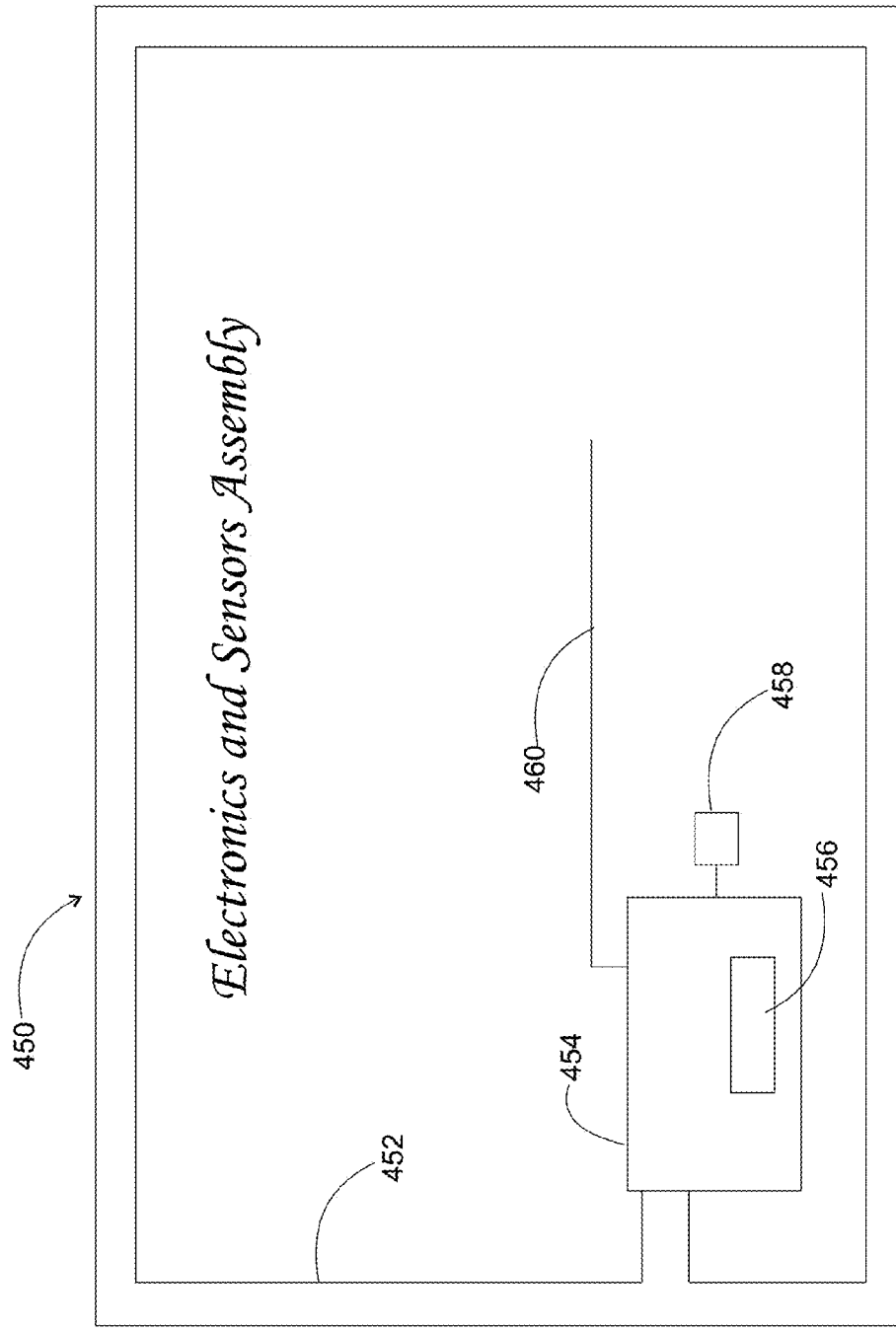
FIG. 7 is a schematic of the operation of the chassis intrusion detector in accordance with the invention.

A schematic of the operation of the chassis intrusion detector of FIG. 1A is provided in FIG. 7 for the labyrinth circuit case. Since the chassis intrusion detector is designed to encompass the entire electronics and sensors assembly, it must be relatively thin so as not to interfere with the microphone and speaker and be transparent such as to not interfere with the display or cameras. One method is to form a film comprising several layers. The first layer adjacent to the apparatus would be a thin plastic film. Onto that layer is deposited a thin layer of a conductive material which can be indium tin oxide or graphic scene. The former is relatively available whereas the grass scene is becoming more and more available. After the conductive layer is deposited onto the first plastic layer, a second thin plastic layer is deposited over the conductive layer and a second conductive layer is deposited onto the second plastic layer. Finally, the assembly is completed with the depositing of a third plastic layer. Each of these layers is typically between about 0.001 and about 0.010 inches thick and the total assembly is transparent.

The chassis intrusion detector can contain its own microprocessor security assembly 454 and battery 458. It also contains its own RAM memory 456. The RAM memory 456 contains the private key which is kept alive by the battery 458. The battery 458 is chosen such that it can provide sufficient power to maintain the RAM memory 456 active for several years and also provide power to the microprocessor to monitor the conductive films. The conductive films are attached to the microprocessor which checks for the capacitance between the two films. Any change in this capacitance detected by the microprocessor is indicative of an attempt to intrude into the interior of the electronics and sensors assembly. If such intrusion is detected then power is removed from the RAM memory 456 and the private key pair raced.

Since a carefully placed hole or multiple holes through the plastic film assembly can cause only a minor change in the capacitance, a preferred alternative construction, as illustrated in FIG. 7, is to replace the two conductive layers and separating plastic film with a single layer comprising a labyrinth of wires which are very narrow and closely spaced such that any attempt to penetrate the film will cause one or more of these wires to be cut. The microprocessor therefore monitors the total resistance, inductance or mutual inductance of this circuit and erases the private key if there is a significant change in these measurements. Since any attempt to break into the electronic and sensor assembly will necessarily sever one of these wires, this design provides an easily detectable method of determining an attempt to intrude into the system electronics and sensor assembly.

A schematic of the chassis intrusion detector system is shown in FIG. 7 generally at 450. Power is supplied from the external computer at 460 through the USB connector 24 of FIG. 1A. Wire 460 also provides communication from the electronics and sensors assembly of which the security assembly SA is a part. The fine wire maze is shown at 452, the security assembly (SA) at 454, the long life battery at 458 and the RAM memory at 456. The security assembly (SA) 454 can be a separate subassembly which is further protected by being potted with a material such that any attempt to obtain access to the wires connecting the battery to the microprocessor therein or to the RAM memory 456 would be broken during such an attempt. This is a secondary precaution since penetration to the SA 454 should not be possible without destroying the private key.

To summarize, any disruption of the mash or conductive film in either of the above described examples will destroy the private key making it impossible to decode the test questions. After the assembly is completed, the computer can be powered on and the first step would be to measure the inductance, resistance, and capacitance, as appropriate, of the mesh or films. Thereafter, if any of these measurements significantly change, then the circuit in the SA 454 would remove power from the RAM memory 456 thereby destroying the private key. Since the private key cannot be reloaded, the assembly would need to be returned to the factory for remanufacture and the insertion of a new SA 454 or entire electronics and sensors assembly.

Figure 8:
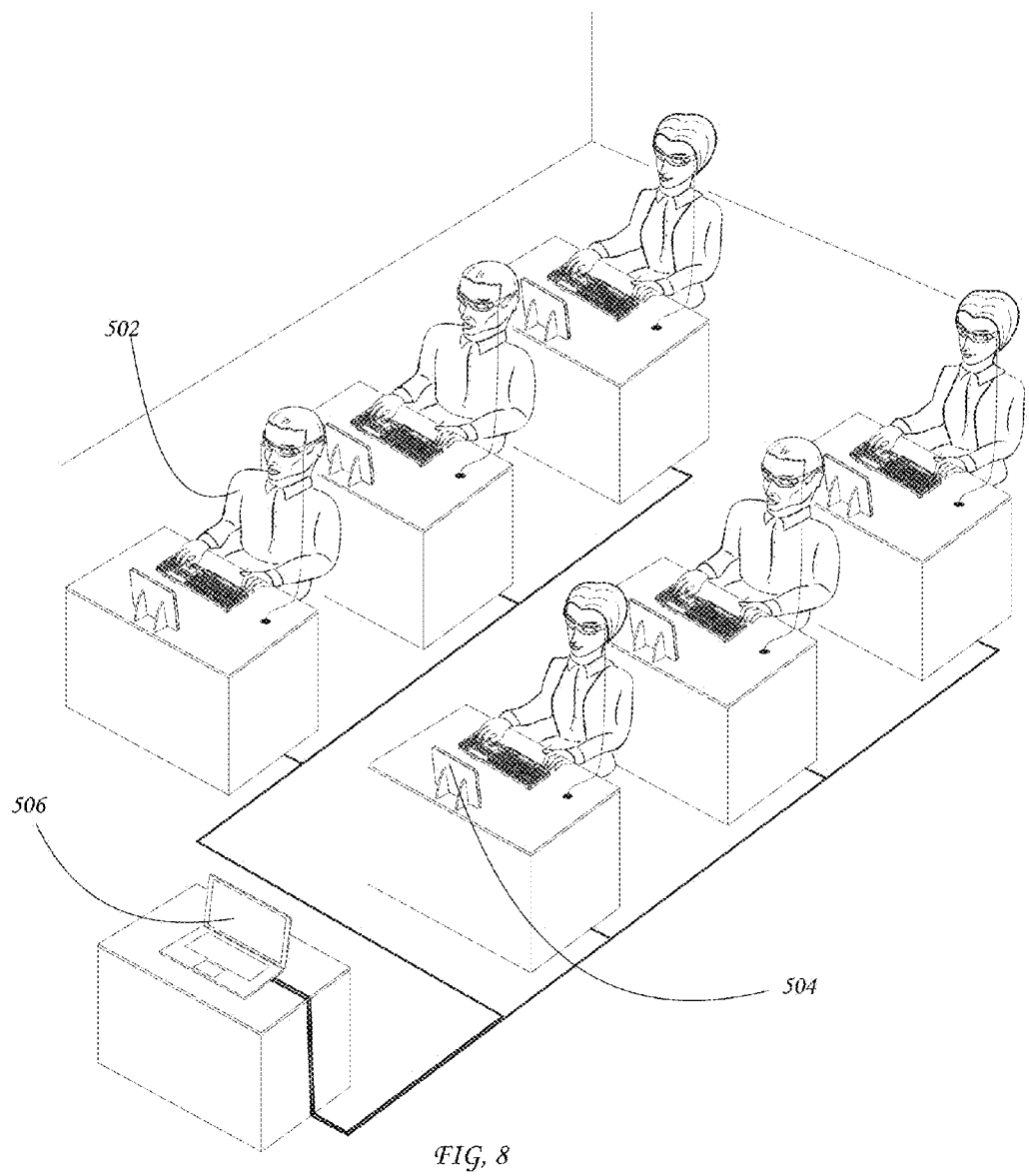
FIG. 8 illustrates the use of the apparatus in accordance with the invention by a room full of test-takers where each device is attached to a central computer through a USB port.

The Test Glasses can be used by students remotely located from the institution providing the test. Alternatively as illustrated in FIG. 8, the Test Glasses can be used by a room full of test-takers where each device is attached to a central computer through, for example, a USB port. In this case, each student 502 is provided with a keyboard and/or a mouse or other input device, and a display 504. Each of the devices is connected to a central computer 506. Otherwise, the operation of the Test Glasses is as described above.

Figure 9:
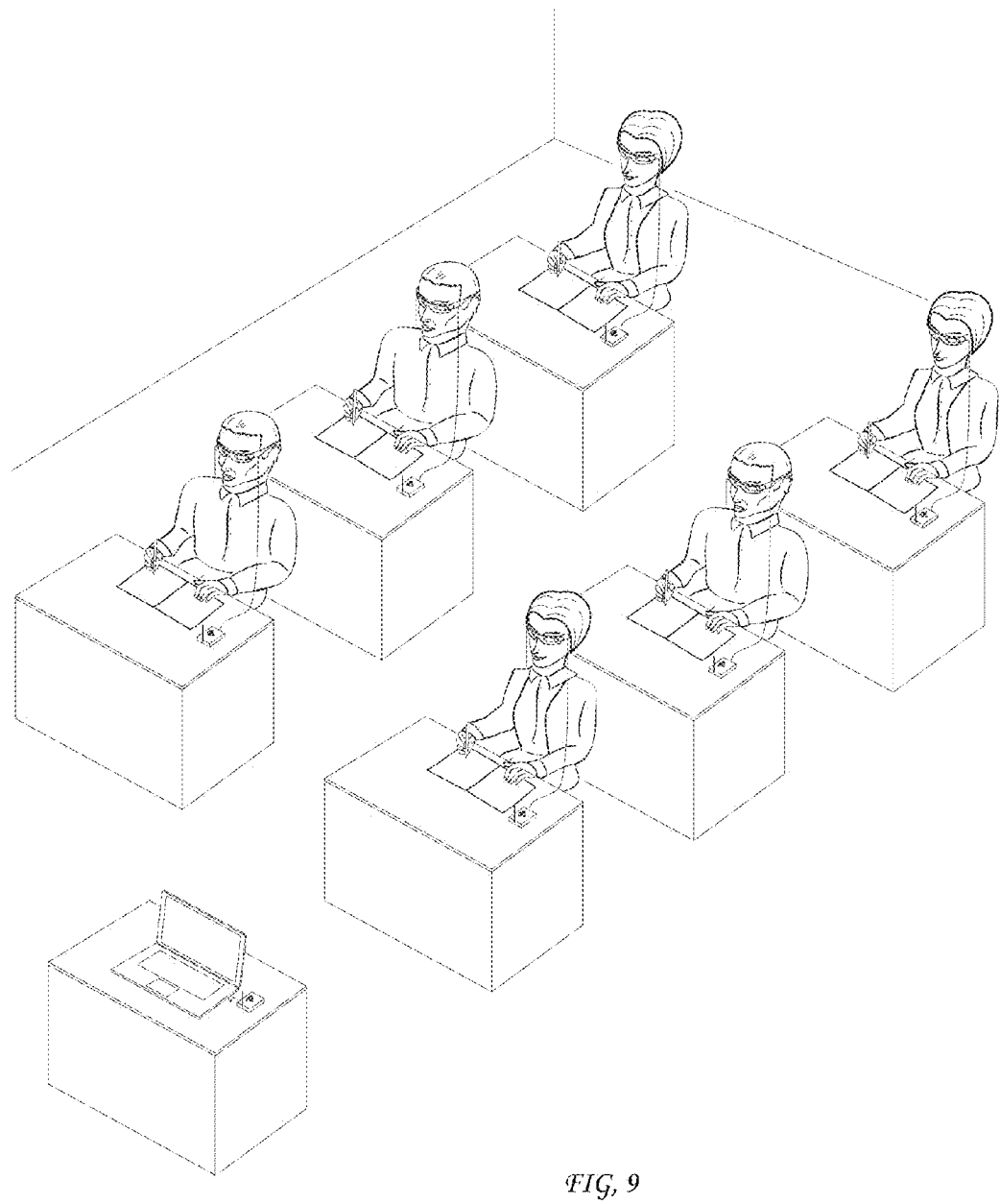
FIG. 9 is a view similar to FIG. 8 with a wireless connection through a wireless transmitter box associated with each desk and where the test-takers are using paper to record their test answers.

FIG. 9 is a view similar to FIG. 8 where the answers are placed on a piece of paper which will be collected by the test proctor at the conclusion of the test. Again, since each student will be taking the same test with the questions randomly reordered, there is no advantage in a student surreptitiously communicating an answer to another student. Thus, by virtue of the arrangements depicted in FIG. 8 and FIG. 9, the Test Glasses can be used either remotely or in a classroom environment.

An exemplifying, non-limiting system process flowchart is illustrated generally at 600 in FIG. 10.

1. The student plugs the USB connector from the Test Glasses into the intermediary computer at step 602, puts on the Test Glasses which recognizes that the student's eye is in view of the iris imaging camera.
2. The student logs on to the Internet and communicates with the test providing institution at step 604. If this communication attempt is successful, then the student will be prompted to identify himself/herself which may include his student identification code or number and indicates that he/she is ready to take a test.
3. The student is prompted to enter the identification of the course for which he or she desires to take the test at step 606. Software at the institution then determines the appropriate test to be provided to the student, for example, based on his or her progress to date. The student's biometrics can now be verified at step 608.
4. The test providing institution modifies the standard test to be given to the test-takers by rearranging the questions in a random order and associates that order with the student's ID.
5. Once the appropriate test has been determined, it is downloaded to the intermediary computer and forwarded to the Test Glasses for decryption and displayed at step 610. The initial page of the test is then displayed on the display 12 of the Test Glasses and the student indicates his or her readiness to start the test at step 612.
6. The Test Glasses continue to perform iris scans throughout the test to verify that the Test Glasses have not been removed and that the proper student is taking the test. Initially, a message can be sent to the test-providing institution via the intermediary computer indicating that the device has successfully verified the student's biometrics if desired by the institution.

7. The Test Glasses performs an analysis from the forward (14) and eye-to-display (30) imagers to verify that the test requirements for the environment are met and a microphone (16) functioning test is performed by the speaker (18) admitting a sound to the microphone which is analyzed to ascertain that it has been properly received at step 614.
8. A display appears on the intermediary computer listing the question numbers and providing a space for the answers.
9. If appropriate, the test timer is started at step 616 and the student proceeds to read the questions and answer them using the keyboard and/or the mouse attached to the intermediary computer.
10. The forward looking camera constantly monitors the field of view of the student to check for any violation of the test rules.
11. The microphone also constantly monitors the sound in the vicinity of the student to check for any verbal violation of the test rules.
12. The iris imaging camera constantly verifies that the iris exists at its expected location indicating that the student continues to wear the Test Glasses.
13. If the iris is not found or there are any other violations of the test rules discovered, then the display is extinguished.
14. Depending on the rules which were violated causing the display to be extinguished, remedial action is undertaken as dictated by the test providing institution.
15. Using the keyboard or mouse associated with the intermediary computer, the student indicates that he has completed taking the test at step 618.
16. Upon completion, the test answers are forwarded to the institution by the intermediary computer.

Special software is required for the external computer. This software may vary depending on the operating system of that computer but generally will be provided by the test-providing institution. This software will manage the interface between the Test Glasses and the test-providing institution. The software also will not permit any information to be displayed on the screen while the test is underway other than information related to the test. The forward monitoring camera 14 will confirm that there is no unexpected information displayed on the computer screen and if so a fault will be indicated and the test terminated.

Some important features of this invention differentiate it significantly from prior art attempts to develop secure testing systems. These include:

1. The use of a head-mounted display for presenting randomized questions to the student in a manner that such questions cannot be obtained or observed by another person. Such a display can be in the form of a small light emitting display held near to the eye of the student or a retinal projector which projects the contents of the display on to the student's retina.
2. The same test is given to multiple students wherein the order of the tests questions is randomized to prevent the passing of answers from one student to another. Each student will take the identical test but the questions are ordered differently.
3. The test taking process is fully automatic and does not require any human intervention. In the event that the student violates the rules of the institution, the particular violation will be noted and provided to the student. The institution will only get involved if the student protests the results.
4. No data is transmitted in an encrypted form from the Test Glasses to the test providing institution. The test-providing institution knows the test that was provided to the student based on his/her ID and therefore knows how to match the test answers with the questions.
5. No video or audio data is forwarded to the test taking institution. If the test was successfully complete it is assumed that no cheating occurred. If the test is interrupted, then diagnostic information can be retained and upon request of the institution forwarded thereto for diagnostic purposes. In general, neither video nor audio information is stored during the test taking process unless the test is interrupted.
6. No behavioral measurements are made, recorded, or sent to the institution and thus it is not necessary to try to interpret cheating activity based on biometric or other measurements.
7. The test questions are only available to the display or retinal projector which are part of the Test Glasses and protected using strong encryption and by the chassis intrusion detecting system.
8. Since it is virtually impossible for a consultant to observe a copy of the test, attempts to determine that a consultant is communicating with the student other than oral communications are unnecessary. Such communications from the consultant are impossible to reliably detect.
9. The decryption private key is created as part of a key pair by the test providing institution and after loading into the test glasses, the private key is destroyed. Since the only copy that exists is on the test glasses and protected by the chassis intrusion detector, no other device can decrypt the test which has been created by the test-providing institution uniquely for the particular Test Glasses.
10. The use of sophisticated neural network based pattern recognition algorithms allow for continuous improvement of this system if and when new cheating methods are discovered. This allows for upgrading the software of the system as new improvements are implemented.

Disclosed herein are a series of measures that are designed to prevent the transfer of test related information to anyone other than the test taking student by any means either visually, electronically, or wirelessly. The measures disclosed herein are not exhaustive and the intent of this invention is to cover preferred implementations of such techniques. Similarly, disclosed herein are a series of measures to prevent information from being transmitted to the test taking student on the assumption that the information about the test has leaked to a consultant. Since the consultant now must transmit to the student information which will affect how the student answers the question, this invention has also not exhaustively disclosed all possibilities of information transferal from the consultant but only representative cases. It is not the intent of the inventor to cover all such transferal means including, for example, haptic methods which have not been discussed above. These include, for example, a wire attached to the student and physically held by the consultant who may in fact be located in another room wherein the wire travels through a hole in a wall. In this case, for example, if the consultant knows the test question and has determined that the proper answer is three then the consultant could pull three times on the wire thereby transmitting this information to the student. All sorts of similar haptic techniques exist including electrically actuated vibrators, spark creators etc. To cover all such possibilities of either the leaks of information out of the test taking device or the communication of information to the student would require volumes. Thus, it is the intent of the inventor to cover all such possibilities while disclosing those that are most readily implemented.

Finally, all patents, patent application publications and non-patent material identified above are incorporated by reference herein. The features disclosed in this material may be used in the invention to the extent possible.

The invention claimed is:

1. A headpiece, comprising:
    a frame having a support portion adapted to be supported on a person's head;
    a housing extending from said frame;
    a first imaging device arranged in connection with said housing to obtain images of an environment around and in front of the person when said support portion is supported on the person's head;
    a biometric identification system arranged in connection with said housing and configured to obtain biometric data about the person when said support portion is supported on the person's head, said biometric identification system comprising a second imaging device arranged in a position on said housing to obtain images of at least one of iris and retina of the person when said support portion is supported on the person's head;
    a display arranged in connection with said housing and viewable by the person when said support portion is supported on the person's head;
    a sound detection interference monitoring system arranged in connection with said housing;
    a memory component arranged in connection with said housing and containing a key that enables decryption of a test provided to the device with the decrypted test being displayed on said display; and
    a processor arranged in connection with said frame and coupled to said first imaging device, said biometric identification system, said display, said sound interference detection system and configured to control content of said display,
    said processor being further configured to monitor detection of audio communications by said sound detection interference monitoring system and images obtained by said first imaging device when said support portion is supported by the person's head and a test is displayed on said display to determine whether a person other than the person on which said support portion is supported is present in images obtained by said first imaging device or orally providing information to the person on which said support portion is supported,
    said processor being further configured to monitor biometric data obtained by said biometric identification system for changes and stop display of the test on said display when a change in biometric data obtained by said biometric identification system is indicative of the person no longer having the device supported on their head.

2. The headpiece of claim 1, wherein said housing is situated below said frame, said housing being substantially L-shaped with a first portion extending straight outward from a lateral side of said frame and second portion at an angle to said first portion and positioned in front of said frame.

3. The headpiece of claim 1, further comprising a third imaging device arranged in a position in connection with said housing in which images obtained by said third imaging device include a portion of said frame or the person's head when said support portion is supported on the person's head.

4. The headpiece of claim 1, further comprising an illuminator that illuminates the iris of the person in conjunction with imaging of the iris by said third imaging device.

5. The headpiece of claim 1, further comprising a connector for connecting said processor to an external electronic device.

6. The headpiece of claim 1, further comprising headphones adapted to overlie ears of the person when said support portion is supported by the person's head.

7. The headpiece of claim 1, wherein said sound detection interference monitoring system comprises a sound generator that transmit sound waves and a sound detector that receives sound waves, said processor being configured to analyze transmitted sound waves relative to received sound waves to assess detection of sound by said sound detector.

8. The headpiece of claim 1, further comprising a chassis intrusion detection system integrated into said frame to prevent access to said processor.

9. The headpiece of claim 1, wherein said second imaging device is an iris scan camera.

10. The headpiece of claim 1, wherein said second imaging device is a retinal scan camera.

11. The headpiece of claim 1, wherein said processor is configured to control content of said display based on input received via said first imaging device and said biometric identification system.

12. The headpiece of claim 1, wherein said processor monitors biometric data obtained by said biometric identification system for changes by comparing biometric data obtained at different times to each other and considering a difference in biometric data to be indicative of more than one person providing the biometric data.

13. The headpiece of claim 1, wherein said housing is situated below said frame, said housing having a first portion extending straight outward from a lateral side of said frame and second portion at an angle to said first portion and positioned in front of said frame, the headpiece further comprising:
    a third imaging device arranged on an inward facing side of said first portion of said housing whereby images obtained by said third imaging device include a portion of said frame and the person's head when said support portion is supported on the person's head;
    an illuminator configured to provide illumination in a field of view of said third imaging device in conjunction with imaging by said third imaging device.

14. The headpiece of claim 13, wherein said sound detection interference monitoring system is arranged on said second portion of said housing and comprises a sound generator that transmit sound waves and a sound detector that receives sound waves, said processor being configured to analyze transmitted sound waves relative to received sound waves to assess detection of sound by said sound detector.

15. The headpiece of claim 2, wherein said display is arranged at a terminal end of said second portion of said housing.

16. The headpiece of claim 2, further comprising a third imaging device arranged on an inward facing side of said first portion of said housing whereby images obtained by said third imaging device include a portion of said frame and the person's head when said support portion is supported on the person's head.

17. The headpiece of claim 2, wherein said second portion of said housing is substantially perpendicular to said first portion of said housing.

18. The headpiece of claim 2, wherein said first imaging device and said a sound detection interference monitoring system are arranged on said second portion of said housing.

19. The headpiece of claim 4, wherein said illuminator is arranged on said housing.

20. The headpiece of claim 4, wherein said housing is situated below said frame, said housing being substantially L-shaped with a first portion extending straight outward from a lateral side of said frame and second portion at an angle to said first portion and positioned in front of said frame, said second imaging device and said illuminator being arranged on said second portion of said housing.

\* \* \* \* \*